US011284709B2

(12) United States Patent
Lu et al.

(10) Patent No.: US 11,284,709 B2
(45) Date of Patent: Mar. 29, 2022

(54) ELECTRIC LIFTING PLATFORM RETRACTABLE UPON HITTING OBSTRUCTION

(71) Applicant: ZHEJIANG JIECANG LINEAR MOTION TECHNOLOGY CO., LTD., Zhejiang (CN)

(72) Inventors: Xiaojian Lu, Zhejiang (CN); Xueli Chen, Zhejiang (CN); Yuchen Tan, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 56 days.

(21) Appl. No.: 16/620,527

(22) PCT Filed: Feb. 2, 2018

(86) PCT No.: PCT/CN2018/075013
§ 371 (c)(1),
(2) Date: Oct. 12, 2020

(87) PCT Pub. No.: WO2018/223720
PCT Pub. Date: Dec. 13, 2018

(65) Prior Publication Data
US 2021/0145164 A1 May 20, 2021

(30) Foreign Application Priority Data

Jun. 9, 2017 (CN) .......................... 201720672892.9

(51) Int. Cl.
*A47B 9/16* (2006.01)
*A47B 9/20* (2006.01)
(Continued)

(52) U.S. Cl.
CPC .................. *A47B 9/16* (2013.01); *A47B 9/20* (2013.01); *A61G 7/018* (2013.01); *A61G 13/04* (2013.01); *A47B 2200/0056* (2013.01)

(58) Field of Classification Search
CPC ....... A47B 13/003; A47B 13/12; A47B 13/08; A47B 1/08; A47B 9/00; A47B 2200/0057;
(Continued)

(56) References Cited

U.S. PATENT DOCUMENTS 6,352,037 B1 * 3/2002 Doyle ....................... A47B 9/00
108/147
10,827,829 B1 * 11/2020 Labrosse .................. A47B 9/20
(Continued)

FOREIGN PATENT DOCUMENTS

CN 201605989 10/2010
CN 204085526 1/2015
(Continued)

OTHER PUBLICATIONS

"International Search Report (Form PCT/ISA/210)" of PCT/CN2018/075013, dated May 2, 2018, with English translation thereof, pp. 1-5.

*Primary Examiner* — Jose V Chen
(74) *Attorney, Agent, or Firm* — JCIPRNET

(57) ABSTRACT

An electric lifting platform retractable upon hitting an obstruction includes a lifting column, a platform, a controller, and a manipulator. The controller comprises a main control unit and a motor driving circuit. An output end of the main control unit is connected to the motor driving circuit. The electric lifting platform further includes a multi-axis sensor module for acquiring obstruction-hitting data of the platform. As the multi-axis sensor module is connected to an input end of the main control unit, the main control unit transmits a control signal to the motor driving circuit after
(Continued)

processing the obstruction-hitting data, and the motor driving circuit controls the lifting column to execute a corresponding retracting movement.

12 Claims, 2 Drawing Sheets

(51) Int. Cl.
*A61G 7/018* (2006.01)
*A61G 13/04* (2006.01)

(58) Field of Classification Search
CPC .... A47B 2200/0062; A47B 2003/0824; A47B 9/043
USPC ............... 108/147, 144.11, 147.19, 147.22; 248/188.1, 188.5, 188.6
See application file for complete search history.

(56) References Cited

U.S. PATENT DOCUMENTS

| | | | | |
|---|---|---|---|---|
| 2009/0044334 | A1* | 2/2009 | Parsell | A61B 5/1115 5/424 |
| 2009/0078167 | A1* | 3/2009 | Ellegaard | A47B 9/00 108/21 |
| 2014/0096706 | A1* | 4/2014 | Labrosse | A47B 9/00 108/21 |
| 2014/0103174 | A1* | 4/2014 | Koder | A47B 9/12 248/188.5 |
| 2016/0106205 | A1* | 4/2016 | Hall | A47B 21/02 700/275 |
| 2016/0296394 | A1 | 10/2016 | Yamasaki et al. | |
| 2016/0309889 | A1* | 10/2016 | Lin | A47B 9/00 |
| 2016/0353880 | A1* | 12/2016 | Sigal | G06Q 10/00 |
| 2016/0367415 | A1* | 12/2016 | Hayes | A61G 1/0281 |
| 2017/0000254 | A1* | 1/2017 | Matlin | A47B 9/02 |
| 2017/0035632 | A1* | 2/2017 | Shih | A61G 7/018 |
| 2017/0251806 | A1* | 9/2017 | Newman | H01R 25/006 |
| 2018/0020831 | A1* | 1/2018 | Lenz | A47C 3/20 297/174 R |
| 2018/0279769 | A1* | 10/2018 | Zheng | A47B 21/02 |
| 2018/0279770 | A1* | 10/2018 | Crowe | A47B 21/02 |
| 2019/0082823 | A1* | 3/2019 | Applegate | A47B 9/00 |
| 2019/0328129 | A1* | 10/2019 | Namala | A47B 9/16 |
| 2020/0329860 | A1* | 10/2020 | Xiang | A47B 13/02 |
| 2021/0000250 | A1* | 1/2021 | Hoyer | A47B 9/00 |
| 2021/0011453 | A1* | 1/2021 | Xiang | G05B 19/402 |
| 2021/0100353 | A1* | 4/2021 | Olesen | G05B 19/045 |
| 2021/0100354 | A1* | 4/2021 | Moller | A47B 9/20 |
| 2021/0236358 | A1* | 8/2021 | Furman | A61G 7/018 |

FOREIGN PATENT DOCUMENTS

| | | |
|---|---|---|
| CN | 104695846 | 6/2015 |
| CN | 205477329 | 8/2016 |
| CN | 205691988 | 11/2016 |
| CN | 106249645 | 12/2016 |
| KR | 101453054 B1 * | 10/2014 |

* cited by examiner

ELECTRIC LIFTING PLATFORM RETRACTABLE UPON HITTING OBSTRUCTION

CROSS-REFERENCE TO RELATED APPLICATION

This application is a 371 of international application of PCT application serial no. PCT/CN2018/075013, filed on Feb. 2, 2018, which claims the priority benefit of China application no. 201720672892.9, filed on Jun. 9, 2017. The entirety of each of the above mentioned patent applications is hereby incorporated by reference herein and made a part of this specification.

BACKGROUND

Technical Field

The present disclosure relates to an electric lifting platform, and more particularly relates to an electric lifting platform retractable upon hitting an obstruction.

Description of Related Art

Electric lifting platforms are generally applied in houses, offices and medical facilities, such as height-adjustable writing desks, kitchen islands, tatamis, office desks, and hospital beds, etc. If the platform or its frame hits an obstacle during lift adjustment, a surrounding structure or the structure of the platform proper could be possibly damaged; it also poses a risk of impacting or squeezing the human body. With the ever-higher demand on product safety, impact detection and obstruction-hitting handling of a lift platform become more and more important.

The existing impact detection schemes for lift platforms on the market mainly include: 1. current characteristic detection upon impact; 2. mechanical sensor-based detection, wherein the mechanical sensor includes a piezoelectric material, a piezoresistive material, and a spring; 3. desktop tilt angle detection. However, experimental analysis and empirical examination reveal that the scheme of current characteristic detection upon impact has a poor sensitivity, is largely susceptible to temperature, and is easily affected by assembly of the lift platform; besides, when the platform is loaded, the current variation is small, such that a reliable impact detection can hardly be achieved, which degrades the safety. As to the scheme of mechanical sensor-based detection, the sensor is required to directly or indirectly contact with a stress-bearing surface, such that to guarantee the sensibility, the sensor has to be installed at a position with a prominent stress variation, posing a higher requirement on installation. As to the scheme of desktop tilt angle detection, a very large pressure is required for a soft impact to cause variation of the tilt angle, which greatly degrades the safety.

SUMMARY

An objective of the present disclosure is to provide an electric lifting platform retractable upon hitting an obstruction, which is more sensitive and safer.

To achieve the above objective, the present disclosure provides the following technical solution. An electric lifting platform retractable upon hitting an obstruction comprises a lifting column, a platform, a controller and a manipulator. The controller comprises a main control unit (MCU) and a motor driving circuit, and an output end of the MCU is connected to the motor driving circuit. The electric lifting platform further comprises a multi-axis sensor module for acquiring obstruction-hitting data of the platform. The multi-axis sensor module is connected to an input end of the MCU. The MCU transmits a control signal to the motor driving circuit after processing the obstruction-hitting data, and the motor driving circuit controls the lifting column to execute a corresponding retracting movement.

Further, the multi-axis sensor module is provided in the controller.

Further, the multi-axis sensor module is fixed inside the controller via a pin header; or, the multi-axis sensor module is flush-jointed to an interior of the controller.

Further, the multi-axis sensor module is provided external to the controller, the controller is provided with a data communication port, and the multi-axis sensor module is electrically connected with the MCU via the data communication port.

Further, the multi-axis sensor module is provided inside the manipulator, or provided inside the lifting column, or provided as a standalone part between the lifting column and the controller, or provided as a standalone part between the manipulator and the controller.

Further, the electric lifting platform further comprises a transverse beam for supporting the platform, the controller is provided on the transverse beam, or the controller is provided on the platform.

Further, the obstruction-hitting data include accelerations along an X-axis, a Y-axis and a Z-axis and/or angular velocities along the three axes, and a plane where the platform is located is a plane formed between any two of the X-axis, Y-axis and Z-axis.

Further, a preset value is set in the MCU or the multi-axis sensor module; the obstruction-hitting data includes the accelerations along the X-axis, Y-axis and Z-axis and the angular velocities along the X-axis, Y-axis and Z-axis. When a variation value of one or more of the six values exceeds the preset value by a predetermined margin within a certain time segment, the motor driving circuit controls the lifting column to execute the corresponding retracting movement.

Further, the multi-axis sensor module includes a central processing unit and a six-axis sensor module, the six-axis sensor module is electrically connected with the central processing unit, and the central processing unit is connected to the input end of the MCU.

Further, the six-axis sensor module is an MPU6050 module, or an ICM20608D module, or an LSM6DSL module.

Further, the six-axis sensor module includes a three-axis accelerometer configured for acquiring three-axis acceleration data and a three-axis gyroscope configured for acquiring three-axis angular velocity data.

Further, the central processor or the MCU includes a filter module for filtering the three-axis acceleration data and the three-axis angular velocity data.

Further, the multi-axis sensor module further comprises a three-axis magnetometer, and the three-axis magnetometer is electrically connected to the six-axis sensor module.

Further, the controller further comprises a feedback circuit configured for monitoring stability of an internal circuit of the controller.

With the above technical solutions, the present disclosure offers the following advantages.

1. By setting a multi-axis sensor module which may acquire platform obstruction-hitting data, variations of platform motion statuses on different axes may be acquired, satisfying detection of platform motion statuses caused by different obstacles at different positions. Besides, the detection is not affected by assembly of the lift platform and is less demanding on the installation position. Further, the sensor is not required to directly contact with the stress-bearing surface, and even an impact with a smaller stress can be detected, thereby offering a better detection sensitivity. As the multi-axis sensor module is connected to the input end of the MCU, the MCU, after having processed the obstruction-hitting data, transmits a control signal to the motor driving circuit, and the latter controls the lifting column to execute a corresponding retracting movement, significantly enhancing safety of the electric lifting platform.

2. The multi-axis sensor module may be installed at various positions, e.g., it may be installed inside the controller or provided external to the controller. When it is installed inside the controller, a better concealment is provided. As the multi-axis sensor module is fixed inside the controller via a pin header, detection sensitivity is enhanced and safety of the electric lifting platform is improved. Or, the multi-axis sensor module is flush-jointed to the interior of the controller, offering a simple and convenient installation process and a high detection sensitivity.

When the multi-axis sensor module is provided external to the controller, a data communication port may be provided for the controller. The multi-axis sensor module is electrically connected to the MCU in the controller via the data communication port, such that installation of the multi-axis sensor module is not limited to the fitting degree with other components of electric lifting platform or limited to a specific stress-bearing mechanism, which simplifies the assembly process between the lifting column and an electric push rod, enhances stability of the entire electric lifting platform, and improves assembly quality. When the multi-axis sensor module is provided external to the controller, it is preferably installed in the manipulator, or installed in the lifting column, or provided as a standalone part between the lifting column and the controller, or provided as a standalone part between the manipulator and the controller. As such, the multi-axis sensor module does not affect the installation and assembly of the transmission part of the lift platform, does not destroy the simplicity and aesthetics of the appearance of the electric lifting platform, has no extra installation requirement for the user, and simplifies installation steps.

3. The controller is provided on the transverse beam or on the platform. As such, it does not affect fitting with other components of the electric lifting platform. Instead, it improves impact detection reliability for the lift platform and significantly enhances safety of the electric lifting platform.

4. The obstruction-hitting data includes the accelerations along the X-axis, Y-axis, and Z-axis and/or angular velocities along the three axes; the plane formed between the X-axis and the Y-axis is the plane where the platform is located; the obstruction-hitting data as acquired include the accelerations along the three axes and/or the angular velocities along the three axes, such that even the desktop is not in a titled state, the multi-axis sensor can also acquire corresponding data to control a motor driving circuit to actuate the lifting column.

5. A preset value is provided in the MCU or the multi-axis sensor module. When a variation value of the obstruction-hitting data exceeds the preset value by a predetermined margin within a certain time segment, the motor driving circuit actuates the lifting column to act, wherein the preset value and the preset margin may be customized according to the user's actual conditions.

6. The multi-axis sensor module includes a six-axis sensor module and a central processing unit. The six-axis sensor module includes a three-axis accelerometer for acquiring three-axis acceleration data and a three-axis gyroscope for acquiring three-axis angular velocities. By detecting variations of multi-dimensional accelerations and multi-axis angular velocity data at the instant of colliding between the platform and the obstacle, the three-axis accelerometer and the three-axis gyroscope realize impact detection. In this way, the detection sensibility is improved and safety of the electric lifting platform is enhanced.

7. The six-axis sensor module is an MPU6050 module, or an ICM20608D module, or an LSM6DSL module. A plurality of models are available for the six-axis sensor modules, and their specific sensitivities also differ. An appropriate six-axis sensor module may be selected according to actual needs.

8. The central processing unit is electrically connected to the six-axis sensor module. The central processing unit comprises a filter module for filtering the three-axis acceleration data and the three-axis angular velocity data. Through data filtering, a normal lift may be distinguished from an impact, thereby avoiding misjudging a normal lift as an impact, which enhances efficiency of impact reaction. The central processing unit is connected to the input end of the MCU, wherein the filtered data are transmitted to the MCU, causing the electric lifting platform to efficiently and quickly respond to the impact to execute a retracting movement, which improves safety of the electric lifting platform.

9. The multi-axis sensor module further comprises a three-axis magnetometer; the three-axis magnetometer may add direction judgment to improve detection precision of the multi-axis sensor, offering a more accurate impact judgment and enhance reliability of the function of the electric lifting platform to retract upon hitting an obstruction. Meanwhile, the three-axis magnetometer may be extended to other applications, e.g., performing lift control to the lifting column by detecting a platform-tapping signal, so as to make the electric lifting platform smarter.

10. The controller comprises a feedback circuit for monitoring stability of the internal circuit of the controller. The feedback circuit constantly monitors the voltage and current statuses inside the entire controller, and monitors information such as the motor rotating speed and operating temperature, etc., so as to adopt a corresponding protection measure to handle exceptions, e.g., Stop Error alarm, power outage, etc., which enhances safety of the controller and makes the electric lifting platform more reliable.

BRIEF DESCRIPTION OF THE DRAWINGS

Hereinafter, the present disclosure will be further illustrated with reference to the accompanying drawings.

DESCRIPTION OF THE EMBODIMENTS

First Embodiment

Figure 1:
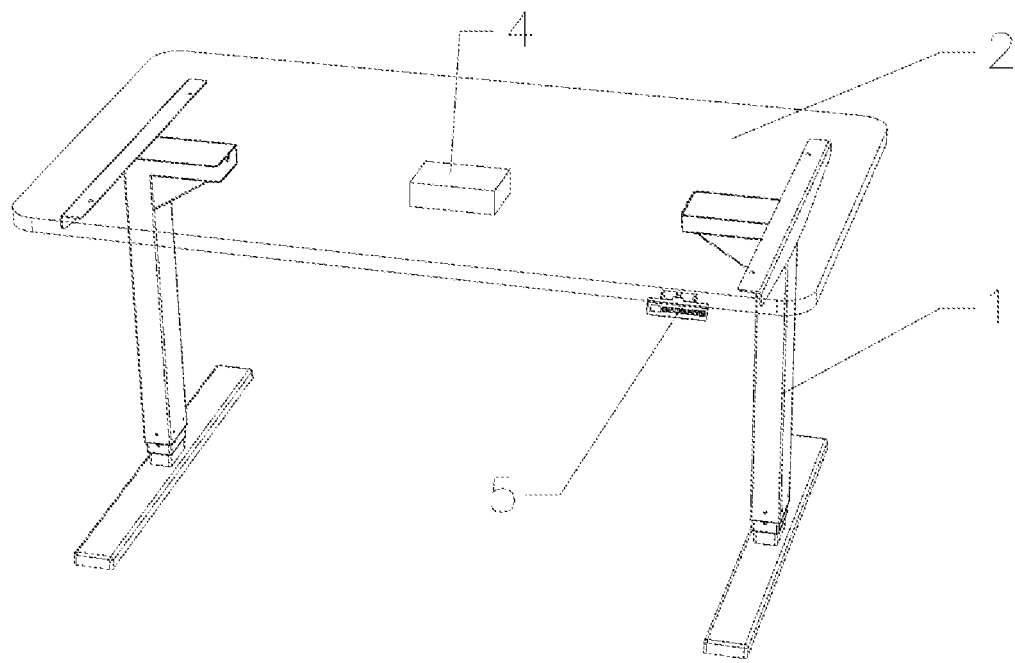
FIG. 1 is a structural schematic diagram of an electric lifting platform according to a first embodiment of the present disclosure.
Figure 2:
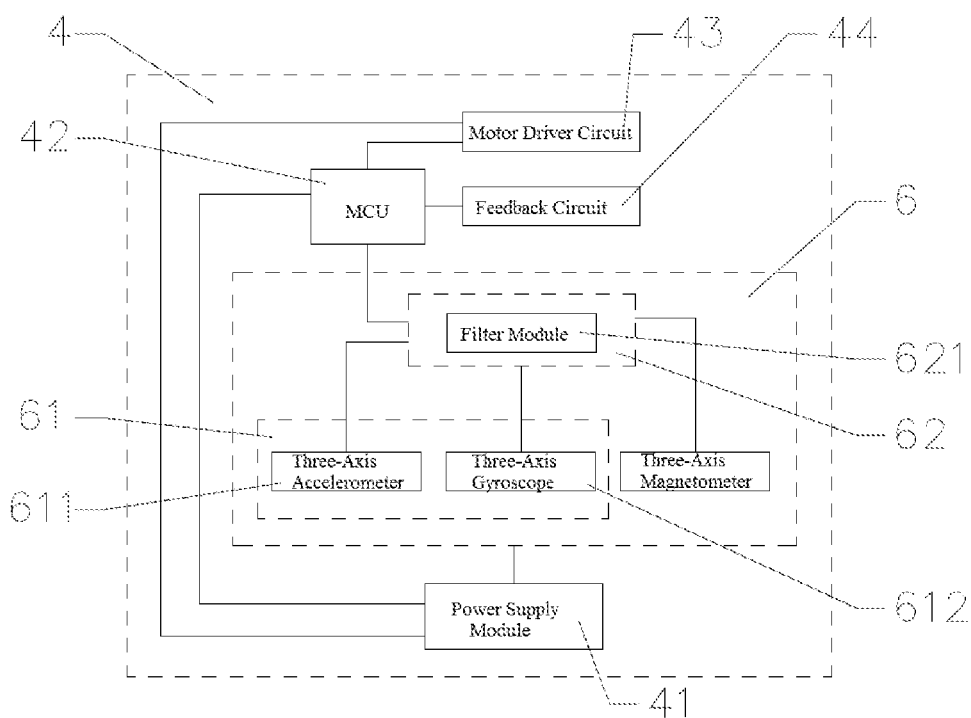
FIG. 2 is a structural schematic diagram of a controller in the electric lifting platform according to the first embodiment of the present disclosure.

As shown in FIG. 1 to FIG. 2, the present disclosure discloses an electric lifting platform retractable upon hitting an obstruction. In this embodiment, the electric lifting platform is an electric lifting desk, such that the platform refers to a desktop of the electric lifting desk. The electric lifting desk comprises a lifting column 1, a desktop 2, a controller 4, a manipulator 5, and a multi-axis sensor module 6 for acquiring platform obstruction-hitting data. The multi-axis sensor module 6 acquires variations of motion statuses of the desktop 2 along different axes, satisfying detection of motion statuses of the desktop 2 caused by different obstacles at different positions. Besides, the detection is not affected by assembly of the lift platform and is less demanding on the installation position. Further, the sensor is not required to directly contact with the stress-bearing surface, and even an impact with a smaller stress can be detected, thereby offering a higher detection sensitivity. The controller 4 comprises a power supply module 41, a main control unit (MCU) 42 and a motor driving circuit 43. An output end of the MCU 42 is connected to the motor driving circuit 43, and the multi-axis sensor module 6 is connected to an input end of the MCU 42, such that the MCU 42 transmits a control signal to the motor driving circuit 43 after processing the obstruction-hitting data, and the motor driving circuit controls the lifting column 1 to execute a corresponding retracting movement. In this way, safety of the electric lifting platform is significantly improved. In this example, the MCU adopts a Freescale HCS08 family microcontroller, which is reliable in motor driving applications. In this way, reliability of the electric lifting platform is improved.

In this embodiment, the obstruction-hitting data includes accelerations along an X-axis, a Y-axis, and a Z-axis and/or angular velocities along the three axes. A plane where the desktop 2 is located is a plane formed between any two of the X-axis, Y-axis, and Z-axis. The obstruction-hitting data as acquired includes the accelerations along the three axes and/or the angular velocities along the three axes. The three-axis data acquisition offers a higher detection sensitivity. Besides, with the three-axis data, detection can be still implemented even the desktop 2 does not tilt. With the accelerations along the three axes as an example, wherein the plane formed between X-axis and Y-axis is the plane where the desktop 2 is located, when the desktop 2 is vertically stressed and the desktop 2 only vibrates vertically in the Z-axis direction, the accelerations along the X-axis and Y-axis approach to zero, but the acceleration variation of Z-axis is significant. In this case, the controller 4 actuates the lifting column to execute a retracting movement. With this control manner, the multi-axis sensor module can directly implement sensing without sensing a tilt angle of the platform. Therefore, the actuation manner in this embodiment is not restricted by whether the desktop 2 tilts, and even the desktop 2 does not tilt, it can be still sensed that the desktop 2 hits an obstacle. In this way, more platform accidental situations can be sensed with a higher sense speed, a higher sensitivity, and a higher accuracy; further, due to not relying on a tilt angle of the desktop 2, the judgement can be performed before tilting of the desktop.

In this embodiment, the multi-axis sensor module 6 is preferably installed in the controller 4, such that installation of the multi-axis sensor module is not restricted by the fitting degree with other components of the electric lifting platform or restricted to a specific stress-bearing mechanism, thereby simplifying the assembly process between the lifting column and an electric push rod, increasing stability of the entire electric lifting platform, and improving quality of assembly. Besides, the multi-axis sensor module does not affect installation and assembly of the transmission part of the lift platform per se, does not destroy the simplicity and aesthetics of the appearance of the lift platform, has no extra installation requirement for the user, and simplifies installation steps.

The multi-axis sensor module 6 preferably includes a six-axis sensor module and a central processing unit. The six-axis sensor module has a plurality of models and specifications, e.g., an MPU6050 module, or an LCM20608D module, or an LSM6DSL module. In this example, the six-axis sensor is an MPU6050 module. The MPU6050 module 61 includes a three-axis accelerometer 611 for acquiring three-axis acceleration data and a three-axis gyroscope 612 for acquiring three-axis angular velocities. By detecting variations of multi-dimensional accelerations and multi-axis angular velocity data at the instant of colliding between the desktop 2 and an obstacle, the three-axis accelerometer 611 and the three-axis gyroscope 612 realize impact detection. In this way, the detection sensibility is improved and safety of the electric lifting platform is enhanced.

It needs to be noted that the three-axis gyroscope 612 in the MPU6050 module has a very high detection sensitivity, such that when the desktop 2 hits an obstacle, even the desktop 2 does not tilt, the three-axis gyroscope 612 can still detect the motion trend of the desktop 2, causing variation of the three-axis angular velocity data. Likewise, the three-axis accelerometer 611 in the MPU6050 is also very sensitive in detection. Therefore, with such a multi-axis sensor module, the judgment does not rely on a tilt angle of the desktop 2, which may be made before the desktop 2 tilts.

In an alternative embodiment, obstruction-hitting data may be acquired independently by the three-axis accelerometer 611 or the three-axis gyroscope 612 to judge whether the platform hits an obstacle. However, repeated experiments show that joint detection by the three-axis accelerometer 611 and the three-axis gyroscope 612 yields higher sensitivity and accuracy. In this embodiment, the central processing unit 62 adopts a highly cost-effective STM32F051K86-model microcomputer. The central processing unit 62 is electrically connected to the MPU6050 module 61. The central processing unit 62 or the MCU 42 further comprises a filter module 621 for filtering the three-axis acceleration data and the three-axis angular velocity data. Through data filtering, a normal lift may be distinguished from an impact, thereby avoiding misjudging a normal lift as an impact, which enhances efficiency of impact reaction. The central processing unit 62 is connected to the input end of the MCU 42 to transmit the filtered data to the latter. The MCU 42, after having processed the obstruction-hitting data, transmits a control signal to a motor driving circuit 43 which then controls the lifting column 1 to execute a corresponding retracting movement. In this way, the electric lifting platform can efficiently and quickly react to the impact to execute a retracting movement, improving safety of the electric lifting platform.

The multi-axis sensor module 6 further comprises a three-axis magnetometer 63, wherein the three-axis magnetometer 63 is electrically connected to the MPU6050 module 61, such that the direction data acquired by the three-axis magnetometer 63, together with the three-axis acceleration data and the three-axis angular data in the MUP6050 module 61, are outputted to the central processing unit 62. In this embodiment, the three-axis magnetometer 63 adopts a high-precision HMC5883L-model three-axis magnetometer. The HMC5883L-model three-axis magnetometer has been revealed in Chinese patent application No. CN 201420544330.2, according to which, the three-axis magnetometer 63 may add a direction judgment to improve the detection precision of the multi-axis sensor 6, causing the judgment regarding an impact more accurate and enhancing reliability of the function of the electric lifting platform to retract upon hitting an obstruction; meanwhile, the three-axis magnetometer 63 may be extended to other applications, e.g., performing lift control to the lifting column by detecting a platform-tapping signal, so as to make the electric lifting platform smarter.

In this embodiment, a preset value is set in the MCU. When the variation value of one or more of the accelerations along the X-axis, Y-axis, and Z-axis, and/or one or more of the angular velocities along the X-axis, Y-axis, and Z-axis, in the obstruction-hitting data acquired by the multi-axis sensor, exceeds the preset value by a predetermined margin within a certain time segment, the motor driving circuit controls the lifting column to execute a corresponding retracting movement. It needs to be noted that because this embodiment adopts a six-axis sensor, there are correspondingly six preset values, i.e., the acceleration of X-axis, the acceleration of Y-axis, and the acceleration of Z-axis, the angular velocity of X-axis, the angular velocity of Y-axis, and the angular velocity of Z-axis, all have their respective preset values. when the variation value of one or more of the six obstruction-hitting data exceeds the corresponding preset value by a preset margin, the motor driving circuit works.

It needs to be noted that the preset values and preset margins may be customized by the user dependent on different actual use environments. Additionally, in other embodiments, the preset values may also be written into the multi-axis sensor.

Additionally, it needs to be noted that to determine more accurately whether the desktop hits an obstruction, the comparative analysis may not be restricted to one comparative analysis, but may be performed between multiple time segments, wherein the variation values are compared with corresponding preset values during each time segment. For example, at the instant when the desktop hits an obstacle, its first time segment T1 is relatively short, wherein the variation values of the obstruction-hitting data in T1 are compared with corresponding preset values. After the impact time T1, a second time segment T2 is taken to compare the variation values of the obstruction-hitting data in T2 with the corresponding preset values; so on and so forth. With such multiple times of comparative analysis, the structure can be determined more accurately and misjudgment may be avoided.

The controller 4 further comprises a feedback circuit 44 for monitoring stability of the internal circuit of the controller 4. The feedback circuit 44 constantly monitors the voltage and current statuses inside the entire controller 4, and monitors information such as the motor rotating speed and operating temperature, etc., so as to adopt a corresponding protection measure to handle exceptions, e.g., Stop Error alarm, power outage, etc., which enhances safety of the controller and makes the electric lifting platform more reliable.

Specifically, the filtering module 621 preferably adopts the Kalman filtering algorithm to perform filtering, so as to better solve the problem of Z-axis data drifting and optimize the filtering process, thereby generating a more accurate filtering result and a higher reliability of the function of the electric lifting platform to retract upon hitting an obstruction.

The multi-axis sensor module 6 may be fixed inside the controller 4 via a pin header, which improves detection sensitivity and enhances safety of the electric lifting platform.

The controller 4 is provided on the desktop 2, such that it does not affect fitting with other components of the electric lifting platform. Instead, it improves impact detection reliability of the lift platform and greatly enhances safety of the electric lifting platform.

It may be understood that the electric lifting platform may also be a height adjustable kitchen island and the platform refers to the platform of the kitchen island.

It may be understood that the electric lifting platform may also be a height adjustable tatami, and the platform refers to the board of the tatami.

It may be understood that the electric lifting platform may also be a height adjustable hospital bed, and the platform refers to the bed board of the hospital bed.

It may be understood that the filtering module 621 may optionally adopt other algorithms such as margin limiting average filtering algorithm to perform filtering, as long as it can distinguish a normal lift from an impact to avoid misjudging the normal lift as an impact.

It may be understood that the multi-axis sensor module 6 may also be flush-jointed in the controller 4.

Second Embodiment

Figure 3:
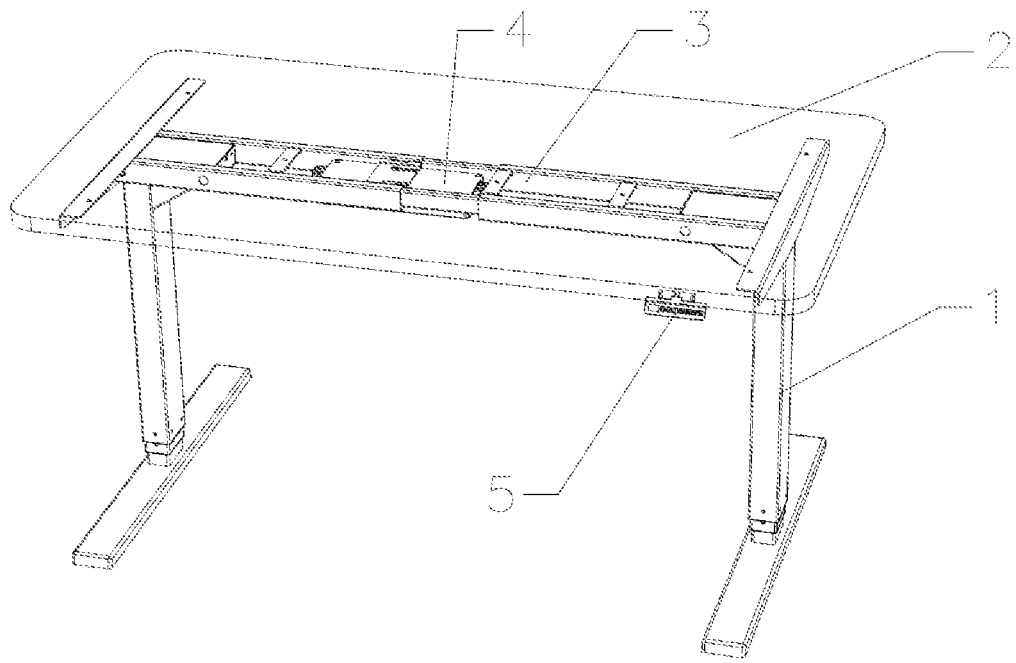
FIG. 3 is a structural schematic diagram of an electric lifting platform according to a second embodiment of the present disclosure.

As shown in FIG. 3, the second embodiment differs from the first embodiment in that the electric lifting platform further includes a transverse beam for supporting the platform.

The controller 4 is securely threaded to the transverse beam 3. Such a setting offers an advantage that the multi-axis sensor module 6 may acquire obstruction-hitting data for the desktop 2 and the transverse beam 3. Besides, the installation position does not affect fitting with other components of the electric lifting platform. Instead, it improves impact detection reliability of the electric lifting platform and significantly enhances safety of the electric lifting platform. In this embodiment, the transverse beam 3 preferably includes two transverse bars, wherein the controller 4 is fixed in the space formed between the two transverse bars. It needs to be noted that the transverse beam 3 is not limited to the shape configuration in this embodiment, but may also be other shape configurations.

It may be understood that the controller 4 may also be installed on the desktop 2, as long as the electric lifting platform can reliably detect an impact.

Third Embodiment

Figure 4:
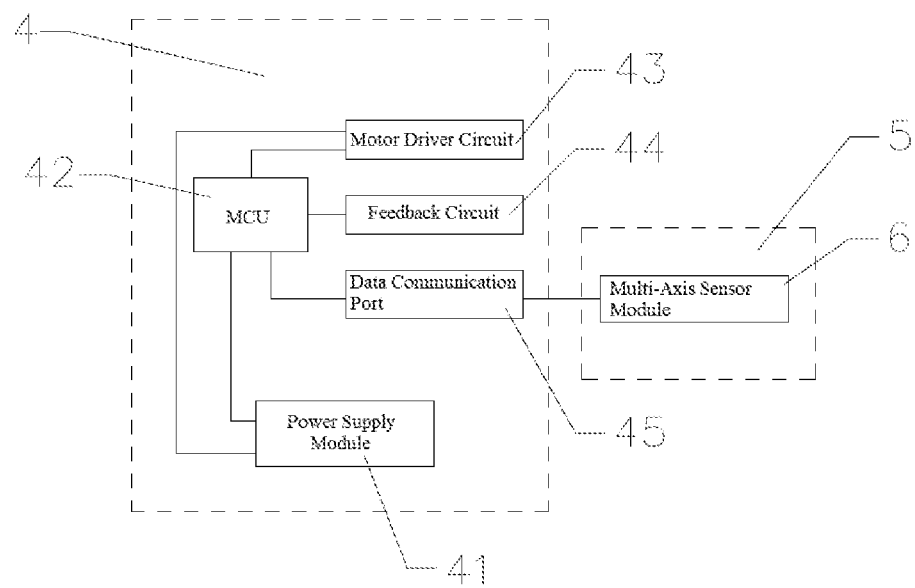
FIG. 4 is a structural schematic diagram of a controller and a manipulator in an electric lifting platform according to a third embodiment of the present disclosure.

As shown in FIG. 4, this embodiment differs from the above embodiments in that the multi-axis sensor module is mounted in the manipulator.

A data communication port 45 is provided on the controller 4, and the multi-axis sensor module 6 is provided in the manipulator 5, such that the multi-axis sensor module 6 is electrically connected to the MCU 42 in the controller 4 via the data communication port 45.

Such a setting offers an advantage that installation of the multi-axis sensor module is not restricted by the fitting degree with other components of the electric lifting platform or restricted to a specific stress-bearing mechanism thereby simplifying the assembly process between the lifting column and an electric push rod, increasing stability of the entire electric lifting platform, and improving quality of assembly. Besides, the multi-axis sensor module does not affect installation and assembly of the transmission part of the lift platform per se, does not destroy the simplicity and aesthetics of the appearance of the lift platform, has no extra installation requirement for the user, and simplifies installation steps.

Specifically, the multi-axis sensor module is fixed inside the manipulator via a pin header, which improves detection sensitivity and enhances safety of the electric lifting platform.

It may be understood that the multi-axis sensor module is flush-jointed in the manipulator, offering a simple and convenient installation process and a high detection sensitivity.

Fourth Embodiment

This embodiment differs from the first embodiment in that the multi-axis sensor module here is mounted in the lifting column. Because the lifting column is fixedly connected to the desktop, after an impact occurs to the desktop, the lifting column will have a corresponding motion trend. When the multi-axis sensor module is installed in the lifting column, a data communication port is provided on the controller, the multi-axis sensor module and the controller are connected via the data communication port. Of course, they may also be connected using a signal line.

It needs to be noted that, the installation position of the multi-axis sensor module is not limited to the embodiments above. In other embodiments, the multi-axis sensor module may be provided as a standalone part between the lifting column and the controller, or may be provided as a standalone part between the manipulator and the controller.

Besides the preferred embodiments above, the present disclosure also has other embodiments. Those skilled in the art may make various variations and alternations based on the present disclosure, and such variations and alterations should fall within the scope defined by the appended claims without departing from the spirit of the present disclosure.

What is claimed is:

1. An electric lifting platform retractable upon hitting an obstruction, the electric lifting platform comprising: a lifting column, a platform, a controller, and a manipulator, wherein the controller comprises a main control unit and a motor driving circuit, an output end of the main control unit is connected to the motor driving circuit, the electric lifting platform further comprising a multi-axis sensor module for acquiring obstruction-hitting data of the platform, wherein the multi-axis sensor module is connected to an input end of the main control unit, the main control unit transmits a control signal to the motor driving circuit after processing the obstruction-hitting data, and the motor driving circuit controls the lifting column to execute a corresponding retracting movement, wherein the multi-axis sensor module includes a central processing unit and a six-axis sensor module, the six-axis sensor module is electrically connected with the central processing unit, the central processing unit is connected to the input end of the main control unit, and the six-axis sensor module includes a three-axis accelerometer configured for acquiring three-axis acceleration data and a three-axis gyroscope configured for acquiring three-axis angular velocity data.

2. The electric lifting platform retractable according to claim 1, wherein the multi-axis sensor module is provided in the controller.

3. The electric lifting platform retractable according to claim 2, wherein the multi-axis sensor module is fixed inside the controller via a pin header; or, the multi-axis sensor module is flush-jointed to an interior of the controller.

4. The electric lifting platform retractable according to claim 1, wherein the multi-axis sensor module is provided external to the controller, the controller is provided with a data communication port, and the multi-axis sensor module is electrically connected with the main control unit via the data communication port.

5. The electric lifting platform retractable according to claim 4, wherein the multi-axis sensor module is provided inside the manipulator, or provided inside the lifting column, or provided as a standalone part between the lifting column and the controller, or provided as a standalone part between the manipulator and the controller.

6. The electric lifting platform retractable according to claim 1, wherein the electric lifting platform further comprises a transverse beam for supporting the platform, the controller is provided on the transverse beam, or the controller is provided on the platform.

7. The electric lifting platform retractable according to claim 1, wherein the obstruction-hitting data includes accelerations along an X-axis, a Y-axis and a Z-axis and/or angular velocities along the X-axis, Y-axis and Z-axis, and a plane where the platform is located is a plane formed between any two of the X-axis, Y-axis and Z-axis.

8. The electric lifting platform retractable according to claim 7, wherein a preset value is set in the main control unit or the multi-axis sensor module; the obstruction-hitting data includes the accelerations along the X-axis, Y-axis and Z-axis and the angular velocities along the X-axis, Y-axis and Z-axis, when a variation value of one or more of the accelerations and the angular velocities exceeds the preset value by a predetermined margin within a certain time segment, the motor driving circuit controls the lifting column to execute the corresponding retracting movement.

9. The electric lifting platform retractable according to claim 1, wherein the six-axis sensor module is an MPU6050 module, or an ICM20608D module, or an LSM6DSL module.

10. The electric lifting platform retractable according to claim 1, wherein the central processor or the main control unit includes a filter module for filtering the three-axis acceleration data and the three-axis angular velocity data.

11. The electric lifting platform retractable according to claim 1, wherein the multi-axis sensor module further comprises a three-axis magnetometer, and the three-axis magnetometer is electrically connected to the six-axis sensor module.

12. The electric lifting platform retractable according to claim 1, wherein the controller further comprises a feedback circuit configured for monitoring stability of an internal circuit of the controller.

* * * * *